3,431,204
GREASE COMPOSITIONS
John J. Giammaria, Woodbury, N.J., assignor to Mobil Oil Corporation, a corporation of New York
No Drawing. Filed June 8, 1965, Ser. No. 462,447
U.S. Cl. 252—28          16 Claims
Int. Cl. C10m 5/20, 5/02

ABSTRACT OF THE DISCLOSURE

Grease compositions are provided containing minor amounts of sodium nitrite and a succinimide represented by the general formula

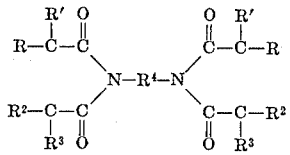

wherein R′, R² and R³ are selected from the group consisting of hydrogen, alkyl and alkenyl, and R⁴ is selected from the group consisting of alkylene and amino alkylene groups having at least 2 carbon atoms.

The use of the aforementioned combination of additives provides satisfactory antirust properties without substantial loss of oxidative stability.

---

This invention relates to grease compositions, and particularly relates to such compositions having improved antirust properties.

Grease compositions are generally used in environments where water, in minute or substantial quantity, is present. By way of illustration, grease compositions are required for: military and naval use, as on the decks of navy and marine vessels; water pumps; mining machinery; steel and paper mills; food processing; and oil-well drilling operations. Thus, while the compositions provide lubricating value, they often fail to protect the metal parts with which they are in contact from rust formation. Required, then, are grease compositions providing excellent lubrication in the presence of moisture, such that rust formation is prevented or inhibited.

Some progress has been made in fortifying grease compositions with rust inhibitors. Particularly effective in this regard is sodium nitrite. However, substantial concentrations of this salt are required to provide satisfactory inhibition and, with such concentrations, there is a material loss of oxidation stability of the compositions. Efforts made to counter this undesirable feature of sodium nitrite by reducing the concentration thereof, have been less than rewarding. For example, many active organic rust inhibitors used together with sodium nitrite, are acidic and cause nitrous oxide to be liberated from the nitrite when the compositions are heated. Accordingly, when sodium nitrite is present in grease compositions for its effectiveness as an antirust agent, there is a need to reduce or obviate its undesirable effect upon oxidation stability.

It is an object of the present invention, therefore, to provide grease compositions having improved antirust properties. Another object is to provide grease compositions containing sodium nitrite of improved antirust properties and oxidation resistance. A further object is to provide such greases containing inorganic thickening agents, and particularly organophilic thickening agents. Another object is to provide additive compositions which can be incorporated into greases. Other objects will be apparent from the following description.

In accordance with the present invention, there are provided grease compositions containing sodium nitrite and as another improving agent, a minor amount sufficient to provide antirust protection, of succinimide represented by the general formula

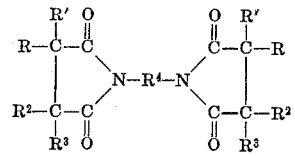

wherein R, R′, R² and R³ are selected from the group consisting of hydrogen, alkyl and alkenyl, and wherein one of such groups is preferably an alkenyl group having from about 8 to about 24 carbon atoms, and R⁴ is selected from the group consisting of alkylene and amino alkylene groups having at least 2 carbon atoms.

In accordance with this invention, there are also provided additive compositions of matter comprising sodium nitrite and a succinimide as defined above.

The succinimides of the general formula can be prepared by reacting about two molar proportions of a succinic anhydride with one molar proportion of an alkylene polyamine, as represented by the following equation:

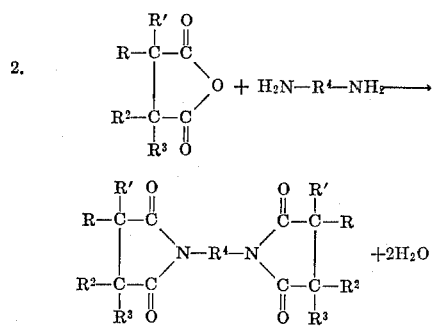

Reaction between the succinic anhydride and the alkylene polyamine is a condensation reaction, wherein water of condensation is formed. Generally, the reaction is carried out at temperatures of the order of 75° C. to 200° C. for a period of time of 1 to 3 hours, until one mole of water per mole of the anhydride is evolved. Water formed during the reaction can be removed by conventional techniques. For example, it can be removed by azeotropic distillation with a non-polar solvent, such as benzene, toluene or xylene. The solvent can be removed from the reaction product, the desired succinimide, as by distillation under vacuum.

It is to be understood that one or two or more of the anhydrides can be used with one or two or more of the polyamines in this reaction, in order to form a single succinimide or a mixture of succinimides.

An important feature in the preparation of the succinimides is the molar ratio of the anhydride and polyamine. Approximately two molar proportions of anhydride are used with one molar proportion of polyamine to insure formation of the desired products.

As indicated, the succinic acid anhydrides used in forming the succinimides have the structure:

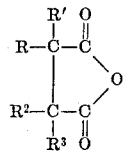

wherein R, R′, R² and R³ are hydrogen, alkyl or alkenyl and wherein one of such groups is preferably an alkenyl radical having from about 8 to about 24 carbon atoms, preferably 10 to 18 carbon atoms. Typical R groups are: octyl; octenyl; diisobutenyl; 2-methyl-heptenyl; 4-ethylhexenyl; nonyl; nonenyl; decyl; decenyl; undecenyl; dodecyl; dodecenyl; triisobutenyl; tetrapropenyl; tetradecyl; tetradecenyl; hexadecyl; hexadecenyl; octadecyl, and octadecenyl.

While the anhydride is preferred as a reactant, the corresponding succinic acid can be used in its stead.

The polyamines used in forming the desired succinimides are preferably diamines, represented as:

$$H_2N-R^4-NH_2$$

wherein $R^4$ is an alkylene group of 2 or more carbon atoms, and preferably has 2 carbon atoms. Typical of such diamines are: ethylene diamine, propylene diamine, butylene diamine, hexylene diamine. Preferred herein is ethylene diamine.

It is also contemplated that tri-, tetra-, penta- and other polyamines can be used. Typical of such amines are: diethylene triamine, triethylene tetramine, tetraethylene pentamine, dipropylene triamine. When polyamines other than diamines are used in forming the desired succinimides, the $R^4$ group of the latter is an amino alkylene group. For example, when tetraethylene pentamine is used $R^4$ is $$-CH_2CH_2NHCH_2CH_2NHCH_2CH_2NHCH_2CH_2-$$

Thus, amino alkylene groups coming within $R^4$ can be represented as:

$$-(C_2H_4)_a-(NH)_b$$

wherein $a$ and $b$ are each integers of 1 or greater.

One or more of the succinimides are used in the grease compositions of this invention in concentrations varying from about 0.1 to about 5, and preferably from about 0.25 to about 2, percent by weight thereof.

Sodium nitrite can be used in the new grease compositions in concentrations of the order of 0.4 to about 20, preferably 1 to 3, percent by weight. Generally, then, the succinimide concentration represents from 25 to 100 percent of the sodium nitrite concentration. The sodium nitrite is generally of a particle size of less than about 5 microns, and preferably less than about 2 microns. Sodium nitrite and a succinimide can be incorporated individually into the grease compositions, or a mixture of the additives can be formed and the mixture can be used in the preparation of the grease compositions.

A wide variety of thickening agents can be used in the greases of this invention. Include among the thickening agents are alkali and alkaline earth metal soaps of fatty acids and fatty materials having from about 12 to about 30 carbon atoms per molecule. The metals are typified by sodium, lithium, calcium and barium. Fatty materials are illustrated by stearic acid, hydroxystearic acid, stearin, cottonseed oil acids, oleic acid, palmitic acid, myristic acid and hydrogenated fish oils.

Other thickening agents include salt and salt-soap complexes as: calcium stearate-acetate (Patent No. 2,197,263); barium stearate-acetate (Patent No. 2,564,561); calcium stearate-caprylate-acetate complexes (Patent No. 2,999,065); calcium caprylate-acetate (Patent No. 2,999,066); and calcium salts and soaps of low-, intermediate- and high-molecular weight acids and of nut oil acids.

Another group of thickening agents comprise substituted ureas, phthalocyanines, indanthrene, pigments such as perylimides, pyromellitdiimides, and ammeline.

The preferred thickening gelling agents employed in the new grease compositions are essentially, hydrophobic clays. Such thickening agents can be prepared from clays which are initially hydrophilic in character, but which have been converted into a hydrophobic condition by the introduction of long chain hydrocarbon radicals into the surface of the clay particles; prior to their use as a component of a grease composition, as, for example, by being subjected to a preliminary treatment with an organic cationic surface active agent, such as an onium compound. Typical onium compounds are tetra alkyl ammonium chlorides, such as dimethyl dioctadecyl ammonium chloride, dimethyl dibenzyl ammonium chloride and mixtures thereof. This method of conversion, being well known to those skilled in the art, is believed to require no further discussion, and does not form a part of the present invention. More specifically, the clays which are useful as starting materials in forming the thickening agents to be employed in the grease compositions, can comprise the naturally occurring chemically unmodified clays. These clays are crystalline complex silicates, the exact composition of which is not subject to precise description, since they vary widely from one natural source to another. These clays can be described as complex inorganic silicates such as aluminum silicates, magnesium silicates, barium silicates, and the like, containing, in addition to the silicate lattice, varying amounts of cation-exchangeable groups such as sodium. Hydrophilic clays which are particularly useful for conversion to desired thickening agents include montmorillonite clays, such as bentonite, attapulgite, hectorite, illite, saponite, sepiolite, biotite, vermiculite, zeolite clays, and the like. The thickening agent is employed in an amount from about 0.5 to about 30, and preferably from 3 percent to 15, percent by weight of the total grease composition.

Oils used in the greases of this invention can be mineral or synthetic oils of lubricating viscosity. Suitable mineral oils have a viscosity (SUS) of at least 40 seconds at 100° F., and particularly those within the range of about 60 seconds to about 6000 seconds at 100° F.

Synthetic vehicles can be used, instead of mineral oils, or in combination therewith. Typical synthetic vehicles are: polypropylene, polypropylene glycol, trimethylol propane esters, neopentyl and pentaerythritol esters, di-(2-ethyl hexyl) sebacate, di(2-ethyl hexyl) adipate, dibutyl phthalate, polyethylene glycol di(2-ethyl hexoate), fluorocarbons, silicate esters, silanes, esters of phosphorus-containing acids, liquid ureas, ferrocene derivatives, hydrogenated mineral oils, chain type polyphenyls, siloxanes and silicones (polysiloxanes), alkyl-substituted diphenyl ethers typified by a butyl-substituted bis-(p-phenoxy phenyl) ether, and phenoxy phenyl ethers.

Other hydrocarbon oils include synthetic hydrocarbon polymers having improved viscosity indices, which polymers are prepared by polymerizing an olefin, or mixture of olefins, having from 5 to 18 carbon atoms per molecule in the presence of an aliphatic halide and a Ziegler-type catalyst. Such synthetic hydrocarbon oils are described by Armstrong et al. in application U.S. Ser. No. 314,575, filed Sept. 26, 1963, and now abandoned.

It is to be understood, however, that the compositions contemplated herein can also contain other characterizing materials. For examples, antioxidants such as phenyl alphanaphthylamine (PAN), corrosion inhibitors, extreme pressure agents, viscosity index agents, and fillers can be used. Among such materials are colloidal silica, calcium acetate, calcium carbonate and molybdenum disulfide. Such characterizing materials do not detract from the lubricating value of the compositions of this invention, nor do they detract from the beneficial character of the succinimides; rather, the characterizing materials serve to impart their customary properties to the particular compositions in which they are incorporated.

The greases of this invention can be prepared in accordance with conventional grease manufacturing procedures, as by any mixing technique wherein solid particles are wetted by a fluid. Typical equipment for such use includes a colloid mill, 3-roll ink mill, Manton-Gaulin homogenizer and the like.

Additive compositions comprising sodium nitrite and the succinimides of the general formula, can be prepared by mixing the materials in the proportions indicated above. One or more of the succinimides can be dissolved in oil and aqueous sodium nitrite is added thereto. The resulting mixture is heated to remove water. Another suitable procedure involves adding the succinimide and the nitrite to a portion of the oil or oils used in forming a grease composition.

The greases of this invention are illustrated in the several following examples, wherein all parts are by weight unless otherwise indicated.

Example 1

266 parts (1 mole) of dodecenyl succinic anhydride were dissolved in 200 parts of benzene in a flask equipped with stirrer, Dean-Stark water trap and condenser. 30 parts (0.5 mole) of ethylene diamine were added dropwise. After the addition was completed, a soft gelatinous mass was formed. This was heated to benzene reflux whereupon a clear solution resulted. Water began to condense in the Dean-Stark trap. 296 parts of mineral oil having a viscosity of 520 SUS at 100° F., were added to reduce the viscosity of the solution. Heating was continued as benzene and water were drawn off through the trap. The temperature was finally raised to about 150° C. and heated under vacuum (about 200 mm.) until no more water was collected in the trap. The collection of 18 parts of water from the reaction indicates formation of imide rather than amic acid. No water would be formed in the latter case. Furthermore, the neutralization number was only 5.0 and infra-red analysis showed the presence of the imide group and no amide. The product is ethylene bis (dodecenyl succinimide).

The following components were heated and agitated together in a grease kettle to form a grease. The components were heated to a temperature of about 160° C. during a period of about one hour and were so maintained for about one-half hour.

| | Parts by weight |
|---|---|
| Mineral oil, viscosity of 80 SUS at 100° F. | 83 |
| Mixed dimethyl dibenzyl and dimethyl dioctadecyl montmorillonites | 10 |
| Pentaerythritol | 1 |
| Antioxidant (PAN) | 1 |
| Sodium nitrite, 25% dispersion in mineral oil having a viscosity of 500 SUS at 100° F. | 4 |

One percent of the ethylene bis (dodecenyl succinimide) formed as described above, containing 50% of the succinimide in mineral oil, was added to the grease. The resulting product was thoroughly mixed while heated at 125° C. for about ¼ hour. The final grease has an ASTM penetration of 287.

Example 2

A grease was formed by the procedure described in Example 1, from the following components:

| | Parts by weight |
|---|---|
| Synthetic ester, isooctyl isodecyl adipate, viscosity of 62.4 SUS at 100° F. | 82.5 |
| Dimethyl dibenzyl ammonium montmorillonite | 10 |
| Pentaerythritol | 1 |
| Antioxidant (PAN) | 1 |
| Extreme pressure agent; 2,2'-thio bis (4,6-dichlorophenol) | 0.5 |
| Sodium nitrite, 25% dispersion in mineral oil (as in Example 1) | 4 |
| Ethylene bis (dodecenyl succinimide), 50% dispersion in mineral oil (as in Example 1) | 1 |

The grease has an ASTM penetration of 292.

The greases of Examples 1 and 2 were subjected to a severe rust test, namely: ASTM Method D1743-60T—Rust Preventative Properties of Lubricating Greases. In this test, clean new bearings are lubricated with the test grease and are then run under a light thrust load for one minute in order to distribute the grease in a pattern that might be found in service. The bearings are stored thereafter for two weeks at 25 C. and 100 percent humidity. After the bearings are cleaned, the bearings are examined for evidence of corrosion. Each test is run in triplicate. A bearing showing no corrosion is rated 1. Incipient corrosion, no more than three spots of a size visible to the naked eye, is rated 2. Anything more serious is rated 3. If the ratings on two or three of the bearings agree, this rating number is reported for the sample. If all three ratings differ, the test is repeated.

Each of the greases of Examples 1 and 2 containing the succinimide passed the test with a 1 rating. In contrast, the grease formed in Example 1 before the succinimide was added thereto, failed in this test with a 3 rating.

The greases of this invention are suitable for a wide range of industrial applications. Some, for example, are suitable for use as multi-purpose automotive greases, serving as chassis, wheel-bearing, water-pump grease lubricants. Others are multi-purpose industrial greases serving as plain-bearing and anti-friction greases for normally loaded and heavily loaded equipment. In general, then, greases contemplated herein range from semi-fluid types suitable as textile machinery lubricants, to solid block type greases used in lubrication of machinery in steel mills, paper mills, and cement mills.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

I claim:

1. A lubricating grease composition containing as improving agents, minor amounts sufficient to provide antirust protection, of sodium nitrite and of a succinimide represented by the general formula

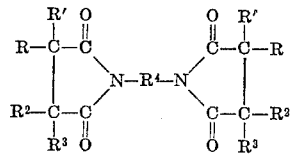

wherein R, R', R² and R³ are selected from the group consisting of hydrogen, alkyl and alkenyl, and R⁴ an alkylene group having at least 2 carbon atoms.

2. A lubricating grease composition containing as improving agents, minor amounts sufficient to provide antirust protection of sodium nitrite and of an alkylene bis (alkenyl succinimide) represented by the general formula

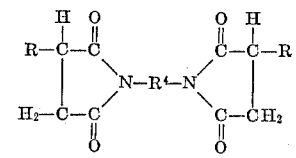

wherein R is an alkenyl group having from about 8 to about 24 carbon atoms, and R⁴ is an alkylene group having at least 2 carbon atoms.

3. A lubricating grease composition defined by claim 2 wherein R is dodecenyl.

4. A lubricating grease composition defined by claim 2 wherein R⁴ is ethylene.

5. A lubricating grease composition defined by claim 2 wherein the alkenyl succinimide is ethylene bis (dodecenyl succinimide).

6. A lubricating grease composition defined by claim 2 wherein the alkenyl succinimide is present in an amount of 0.1 percent to about 5 percent by weight.

7. A lubricating grease composition comprising an oil of lubricating viscosity, a grease-forming quantity of an inorganic thickening agent and minor amounts, sufficient to provide antirust protection, of sodium nitrite and a succinimide defined in claim 1.

8. A lubricating grease composition comprising an oil of lubricating viscosity, a grease-forming quantity of an organophilic clay thickener, up to about 3 percent by weight of sodium nitrite, and a minor amount, from about 0.1 to about 5 percent by weight, of a succinimide defined in claim 1.

9. A lubricating grease composition comprising an oil of lubricating viscosity, a grease-forming quantity of an inorganic thickening agent and minor amounts, sufficient to provide antirust protection, of sodium nitrite and of an alkylene bis (alkenyl succinimide) defined in claim 2.

10. A lubricating grease composition comprising an oil of lubricating viscosity, a grease-forming quantity of an inorganic organophilic clay thickener, up to about 3 percent by weight of sodium nitrite, and a minor amount, from about 0.1 to about 5 percent by weight, of an alkylene bis (alkenyl succinimide) defined in claim 2.

11. A lubricating grease composition defined by claim 10 wherein the thickener is dimethyl dibenzyl ammonium montmorillonite.

12. A lubricating grease composition comprising a major proportion of a paraffinic mineral lubricating oil, a grease-forming quantity of dimethyl dibenzyl ammonium montmorillonite, about one percent by weight of sodium nitrite and about one-half percent by weight of ethylene bis (dodecenyl succinimide).

13. A lubricating grease composition comprising a major proportion of a synthetic ester lubricating oil, a grease-forming quantity of dimethyl dibenzyl ammonium montmorillonite, about one percent of sodium nitrite and about one-half percent by weight of ethylene bis (dodecenyl succinimide).

14. A composition of matter comprising sodium nitrite and a succinimide defined in claim 1.

15. A composition of matter comprising sodium nitrite and an alkylene bis (alkenyl succinimide) defined in claim 2.

16. A composition of matter comprising from about 0.25 to about 3 parts by weight of sodium nitrite and from about 0.1 to about 2 parts by weight of an alkylene bis (alkenyl succinimide) defined in claim 2.

References Cited

UNITED STATES PATENTS

| | | | |
|---|---|---|---|
| 2,648,633 | 8/1953 | Peterson et al. | 252—51.5 |
| 2,875,152 | 2/1959 | Van Scoy | 252—28 |
| 3,004,987 | 10/1961 | Paris et al. | 252—51.5 |
| 3,078,226 | 2/1963 | Morway et al. | 252—25 |
| 3,131,150 | 4/1964 | Stuart et al. | 252—51.5 |
| 3,154,560 | 10/1964 | Osuch | 252—51.5 |
| 3,278,427 | 10/1966 | Butcosk | 252—25 |

DANIEL E. WYMAN, *Primary Examiner.*

I. VAUGHN, *Assistant Examiner.*

U.S. Cl. X.R.

252—25, 51.5